United States Patent
Gong et al.

(10) Patent No.: US 7,489,480 B2
(45) Date of Patent: Feb. 10, 2009

(54) LAMINATED ACTUATOR ARM IN A HARD DISK DRIVE

(75) Inventors: Zhong-Qing Gong, Fremont, CA (US); Shiaohua Chen, Palo Alto, CA (US); Tho Pham, Milpitas, CA (US)

(73) Assignee: Samsung Electronics, Inc., Suwon (KR)

( * ) Notice: Subject to any disclaimer, the term of this patent is extended or adjusted under 35 U.S.C. 154(b) by 340 days.

(21) Appl. No.: 11/366,044

(22) Filed: Mar. 1, 2006

(65) Prior Publication Data
US 2007/0206332 A1    Sep. 6, 2007

(51) Int. Cl.
*G11B 5/55* (2006.01)
(52) U.S. Cl. .................................................. 360/265.9
(58) Field of Classification Search .............. 360/234.5, 360/265.7, 265.8, 265.9
See application file for complete search history.

(56) References Cited

U.S. PATENT DOCUMENTS

| | | | |
|---|---|---|---|
| 5,930,581 A * | 7/1999 | Born et al. ..................... 419/5 |
| 6,744,597 B2 * | 6/2004 | Nguyen et al. ........... 360/234.5 |
| 6,879,466 B1 * | 4/2005 | Oveyssi et al. ........... 360/265.7 |
| 6,925,715 B2 * | 8/2005 | Ramsdell ................. 29/898.07 |
| 7,016,157 B1 * | 3/2006 | Williams et al. ......... 360/265.7 |
| 7,035,051 B1 * | 4/2006 | Coon ..................... 360/245.9 |
| 7,352,537 B2 * | 4/2008 | Dominguez et al. ...... 360/265.7 |
| 2003/0169537 A1 * | 9/2003 | Weichelt et al. .......... 360/265.9 |
| 2004/0181933 A1 * | 9/2004 | Detjens et al. ........... 29/603.03 |
| 2006/0291104 A1 * | 12/2006 | Dominguez et al. ...... 360/265.7 |

* cited by examiner

*Primary Examiner*—Allen T Cao
(74) *Attorney, Agent, or Firm*—Ben J. Yorks; Irell & Manella LLP

(57) ABSTRACT

A laminated actuator arm of a hard disk drive. The actuator arm can be laminated with a relatively stiff material and a low density material. The stiff material can provide structural integrity for the arm. The low density material may be a damping material that damps shock and vibration energy transmitted into the arm.

12 Claims, 2 Drawing Sheets

LAMINATED ACTUATOR ARM IN A HARD DISK DRIVE

BACKGROUND OF THE INVENTION

1. Field of the Invention

The present invention relates to an actuator arm of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are attached to an actuator arm which has a voice coil motor that can move the heads across the surfaces of the disks.

FIG. 1 shows a typical actuator arm 1 of the prior art. The actuator arm 1 includes a plurality of beams 2 that extend from a bearing section 3. The bearing section and beams are constructed from a homogenous piece of aluminum. A plastic insert 4 is attached to the bearing section 3 and a voice coil 5 is attached to the insert 4.

Information is stored in radial tracks that extend across the surfaces of each disk. Each track is typically divided up into a number of segments or sectors. The voice coil motor and actuator arm can move the heads to different tracks of the disks.

The disks of the drive are rotated by a spindle motor. The rotating disks create a flow of air within the disk drive. The heads each have surface features that form air bearings between the heads and the disks. The air bearings reduce/eliminate mechanical wear between the heads and the disk surfaces.

The air flow may also cause vibration in the actuator arm. The vibration may cause oscillating movement of the heads and track mis-registration that degrades the performance of the disk drive. Additionally, the heads may also have undesirable oscillating movement due to external shock or vibration loads. It would be desirable to provide an actuator arm that damps shock and vibration loads. It would be desirable to provide a damping actuator arm that was relatively easy and inexpensive to implement in a hard disk drive.

BRIEF SUMMARY OF THE INVENTION

An actuator arm of a hard disk drive. The actuator arm includes a first layer of material laminated to a second layer of material.

DETAILED DESCRIPTION

Disclosed is a laminated actuator arm of a hard disk drive. The actuator arm can be laminated with a relatively stiff material and a low density material. The stiff material can provide structural integrity for the arm. The low density material may be a damping material that damps shock and vibration energy transmitted into the arm.

Figure 2:
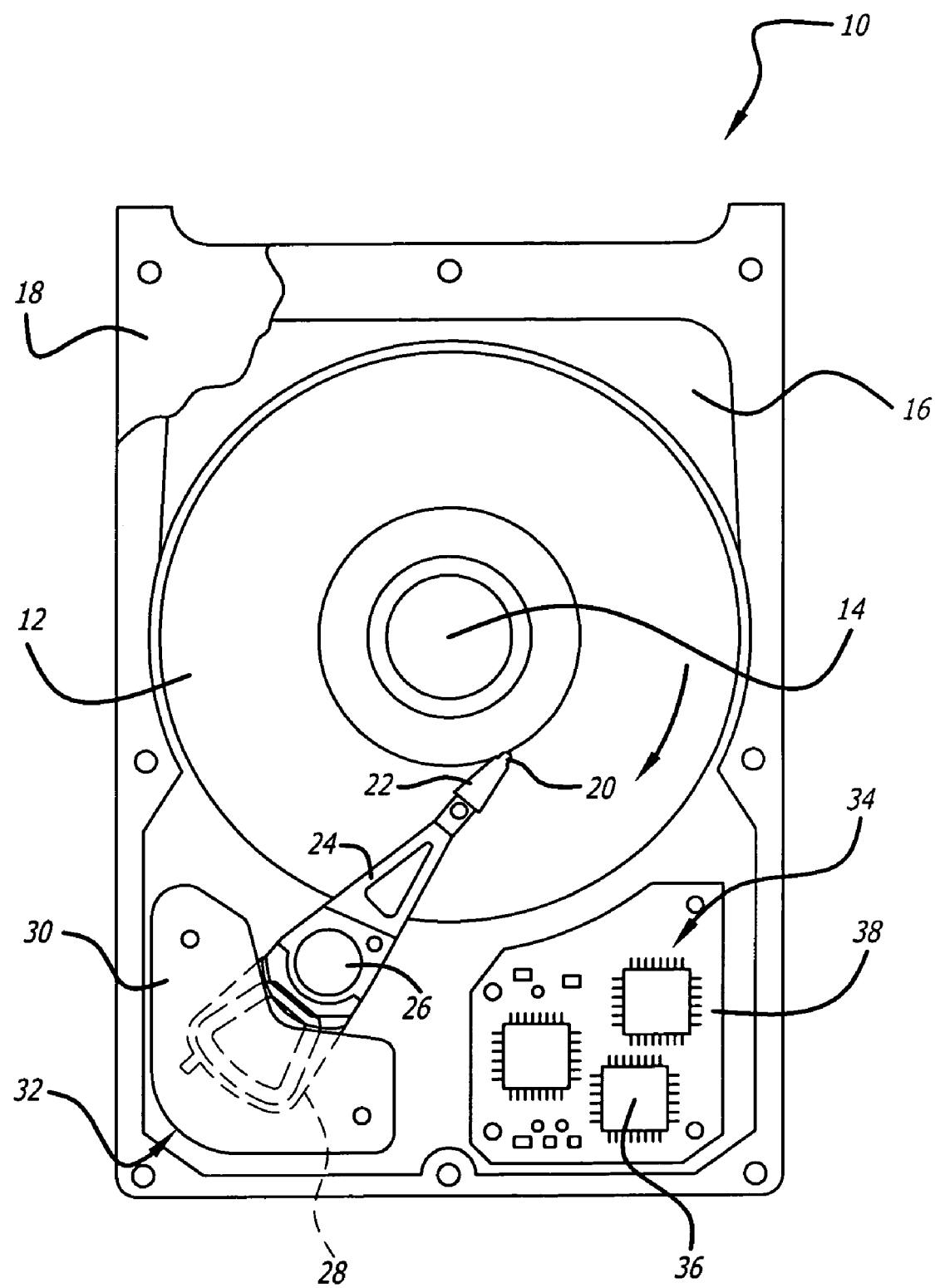
FIG. 2 is a top view of an embodiment of a hard disk drive of the present invention.

Referring to the drawings more particularly by reference numbers, FIG. 2 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown) that magnetize and sense the magnetic fields of the disks 12.

Each head 20 may be gimbal mounted to a flexure arm 22 as part of a head gimbal assembly (HGA). The flexure arms 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

The hard disk drive 10 may include a printed circuit board assembly 34 that includes a plurality of integrated circuits 36 coupled to a printed circuit board 38. The printed circuit board 38 is coupled to the voice coil 28, heads 20 and spindle motor 14 by wires (not shown).

Figure 1:
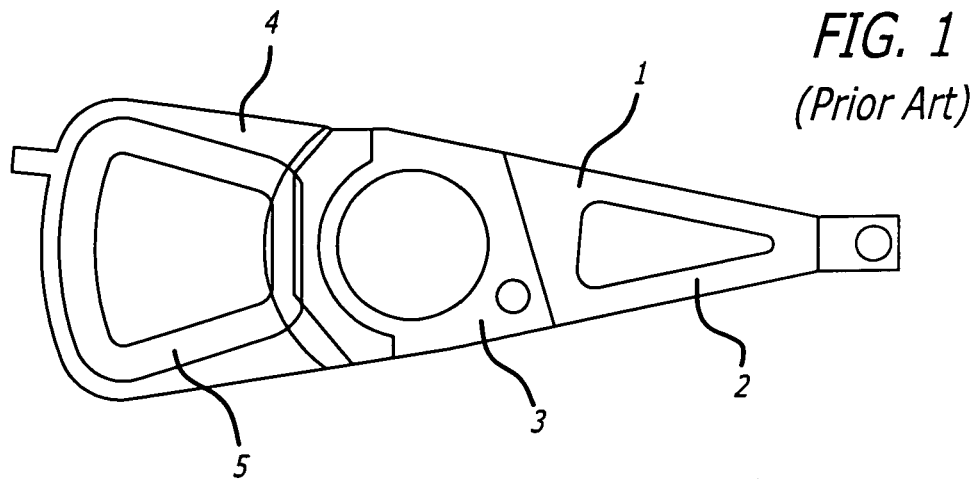
FIG. 1 is a top view of an actuator arm of the prior art.
Figure 3:
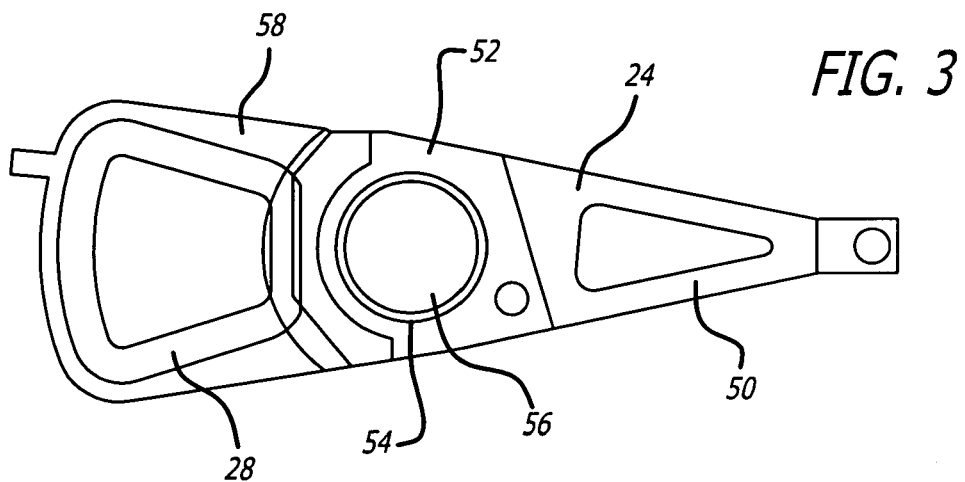
FIG. 3 is a top view of an actuator arm of the hard disk drive.
Figure 4:
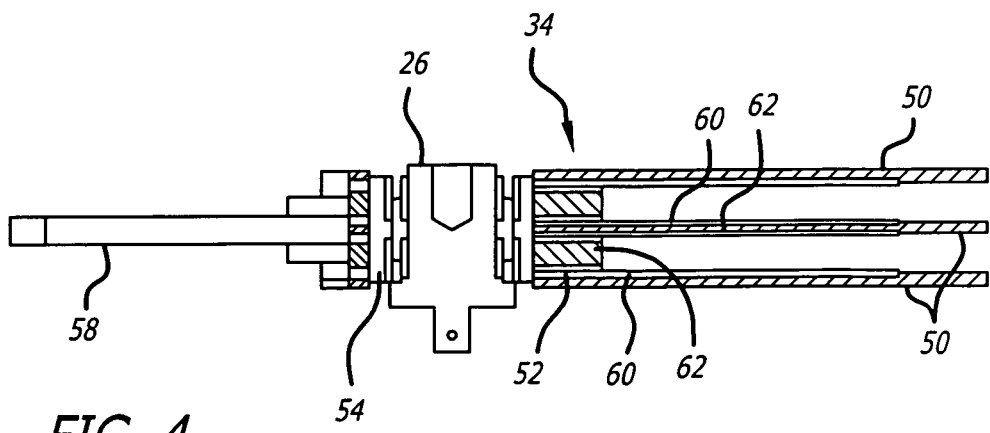
FIG. 4 is a side sectional view of the actuator arm.

FIGS. 3 and 4 show an embodiment of the actuator arm 24. The arm 24 may include a plurality of beams 50 that extend from a bearing section 52. The bearing section 52 may include a bearing sleeve 54 that cooperates with the pivot bearing 26 to allow rotation of the arm 24. The sleeve 54 includes an opening 56 that receives the bearing 26. A plastic insert 58 may be attached to the bearing section 52. The voice coil 28 can be attached to the insert 58.

The beams 50 and bearing section 52 may be constructed as a laminate. The laminate may include a first layer of material 60 laminated to a second layer of material 62. The first layer of material 60 may be a relatively stiff material that provides structural integrity for the arm 24, particularly the beams 50. The second layer of material 62 may be a low density material that damps energy.

By way of example, the first layer of material 60 may be aluminum and the second layer of material 62 may be a polyimide. The second layer of material 62 may be other materials such as epoxy. Likewise, the first layer of material 60 may be a different relatively stiff material. Various layer thicknesses and compositions may be employed to obtain the desired stiffness and damping characteristics.

Through analytical modeling it was found that replacing an aluminum actuator arm with a laminated arm can improve shock performance by 8.3%, 2.1% and 3.2% for shocks of 0.5 ms, 1.0 ms and 2.0 ms, respectively. Arm sway can be improved by 13.3%. The mass and moment of inertia can be reduced by 7.0%.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An actuator arm of a hard disk drive, comprising:
   a first layer of material;
   a second layer of material laminated to said first layer of material, a plastic insert attached to said laminated first and second layers of material; and,
   a voice coil attached to said plastic insert.

2. The arm of claim 1, wherein said first layer of material is a metal and said second layer of material is damping material.

3. The arm of claim 2, wherein said first layer of material includes aluminum and said second layer of material includes a polyimide.

4. The arm of claim 1, further comprising a plastic insert attached to said first and second layers of material.

5. The arm of claim 1, wherein said first and second layers of material form a beam.

6. The arm of claim 1, wherein said first and second layers of material include a pivot bearing opening.

7. A hard disk drive, comprising:
   a base plate;
   a spindle motor attached to said base plate;
   a disk coupled to said spindle motor;
   an actuator arm coupled to said base plate, said actuator arm including a first layer of material laminated to a second layer of material, a plastic insert attached to said laminated first and second layers of material;
   a head coupled to said actuator arm and coupled to said disk; and,
   a voice coil attached to said plastic insert.

8. The disk drive of claim 7, wherein said first layer of material is a metal and said second layer of material is damping material.

9. The disk drive of claim 8, wherein said first layer of material includes aluminum and said second layer of material includes a polyimide.

10. The disk drive of claim 7, further comprising a plastic insert attached to said first and second layers of material and said voice coil.

11. The disk drive of claim 7, wherein said first and second layers of material form a beam.

12. The disk drive of claim 7, wherein said first and second layers of material includes a pivot bearing opening.

* * * * *